Figure 1:
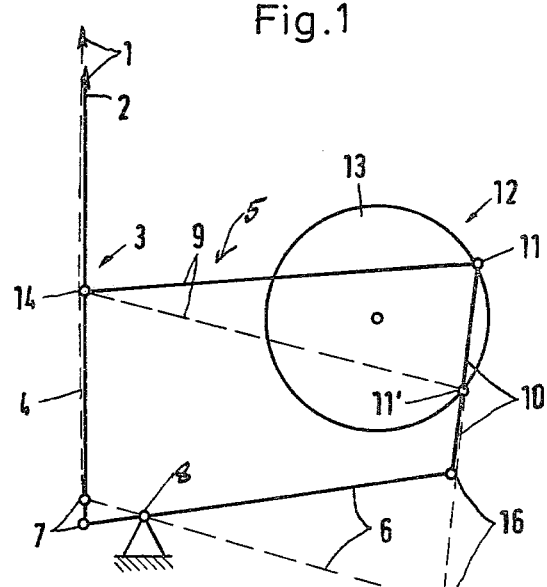

United States Patent [19]

Brunner

[11] 4,208,924
[45] Jun. 24, 1980

[54] DRIVE FOR OPERATING A PUNCHING TOOL

[76] Inventor: Anton Brunner, Hauptstrasse 134, Durmersheim, Fed. Rep. of Germany, D-7552

[21] Appl. No.: 852,283

[22] Filed: Nov. 17, 1977

[51] Int. Cl.² ............................................. F16H 21/18
[52] U.S. Cl. ............................................................ 74/47
[58] Field of Search ................ 74/47, 520, 38; 108/81

[56] References Cited

U.S. PATENT DOCUMENTS

| | | | |
|---|---|---|---|
| 883,024 | 3/1908 | Humpert | 74/38 |
| 934,690 | 9/1909 | Nissen | 74/38 |
| 3,822,603 | 7/1974 | Morita et al. | 74/38 |

Primary Examiner—Samuel Scott
Assistant Examiner—Wesley S. Ratliff, Jr.
Attorney, Agent, or Firm—Kurt Kelman

[57] ABSTRACT

A drive for operating a punching tool comprises a toggle-joint lever to one of whose lever members the punching tool is operatively connected. The second lever member of the toggle-joint forms part of a quadrilateral linkage. This linkage consists of the second lever member, a first transverse lever member linked at one end to the second lever member and at the other end to another lever element, and a second transverse lever member linked at one end to the other lever element. The first transverse lever member is a two-armed lever supported on a fixed pivot near its linkage to the second lever member for pivoting the two-armed lever about the fixed pivot. The second transverse lever member and the other lever element are linked to a crank drive.

4 Claims, 3 Drawing Figures

DRIVE FOR OPERATING A PUNCHING TOOL

The present invention relates to a drive for operating a punching tool especially designed to perforate the connecting webs between a series of cups, bowls, or like shapes of relatively large depth made of hard, tough and frangible synthetic resin sheet material. Such connecting webs are preforated by punching tools movable in relation to each other.

Perforating such materials poses rather severe problems since considerable punching force is required and the punching tools are subjected to great wear. Therefore, these connecting webs have heretofore merely been scored lightly to facilitate their subsequent breakage by the consumer who bought a series of conncted vessels and who then had to bend the connecting web back and forth several times along the score line to separate the vessels from each other. If this is to be avoided and the connecting webs are to be scored by a line of perforation to facilitate a clean separation along such a line, the perforating apparatus must take into account not only the high punching pressures required but also the relatively long stroke the punching tool must execute to pass between the adjacent cups to the connecting web resting against a template forming a counter-support for the web to be perforated.

The type of perforation contemplated by this invention involves webs of hard, tough and frangible synthetic resin sheet material provided with a line of closely adjacent slits of an order of magnitude of 0.2 to 0.4×6 mm, leaving only a few minor connecting portions between the slits, which may be readily broken.

It is the primary object of the invention to provide a drive for a punching tool capable of making such perforations not only with the required force but also with an effective and rapid working stroke.

The above and other objects are accomplished in accordance with the present invention by a drive for operating a punching tool, which comprises a toggle-joint lever having a first lever member and a second lever member. The punching tool is operatively connected to the first lever member and the second lever member forms part of a quadrilateral linkage. The linkage consists of the second lever member, a first transverse lever element, a first linkage point at which one end of the second lever member is linked to one end of the first transverse lever element, another lever element, a second linkage point at which the other end of the first transverse lever element is linked to one end of the other lever element, the first tranverse lever element being a two-armed lever, a second transverse lever element, and a third linkage point at which the other end of the other lever element is linked to one end of the second transverse lever element. A fixed pivot supports the first transverse two-armed lever element near the first linkage point for pivoting the two-armed lever about the pivot, and the third linkage point is linked to a crank drive.

With such a drive, the punching tool is pressed with considerable force in the end phase of its working stroke to effectuate the perforation, and this force is obtained with the same driving motion which carries the tool through a relatively long working stroke.

Figure 2:
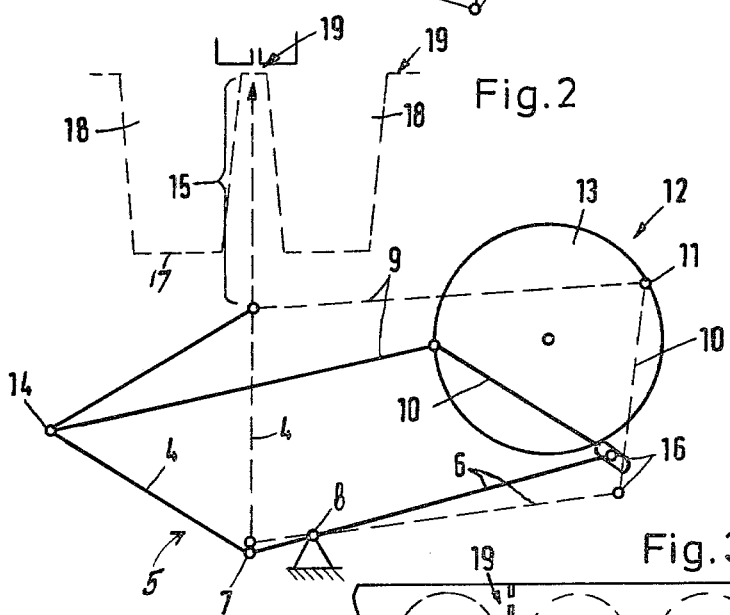
Figure 3:
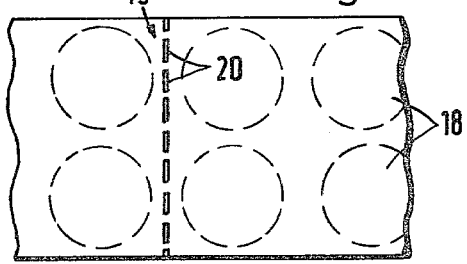

The above objects, advantages and features of this invention will become more apparent from the following detailed description of a now preferred embodiment thereof, taken in conjuction with the accompanying drawing which schematically illustrates the drive system and wherein FIG. 1 shows the drive in the position wherein it executes the working stroke;

FIG. 2 shows the drive in its end position as the punching tool is withdrawn; and FIG. 3 is a top view of a connecting web interconnecting a series of cups and perforated by a punching tool operated by a drive according to the invention.

Referring now to the drawing and first to FIGS. 1 and 2, there is shown toggle-joint lever 3 having a first lever member whose upper end 2 is operatively connected to punching tool 1 indicated only diagrammatically, and second lever member 4. As shown the second lever member forms part of quadrilateral linkage 5. This linkage consists of second lever member 4, first transverse lever element 6, first linkage point 7 at which one end of the second lever member is linked to one end of the first transverse lever element, another lever element 10, second linkage point 16 at which the other end of first transverse lever element 6 is linked to one end of the other lever element 10, a second transverse lever element 9, and a third linkage point 11 at which the other end of the other lever elememt 10 is linked to one end of second transverse lever element 9. First transverse lever element 6 is a two-armed lever supported on fixed pivot 8 near first linkage point 7 for pivoting of the two-armed lever about the fixed pivot. Third linkage point 11 is linked to crank drive 12 which, in the illustrated embodiment, is flywheel 13. Furthermore, in the illustrated embodiment, the other end of second transverse lever element 9 and the other end of second lever member 4 are linked at 14 to an end of the first lever member of the toggle-joint remote from point 2 where punching tool 1 is conncceted thereto.

Toggle-joint lever 3, as shown by the full and broken line positions indicated in FIGS. 1 and 2, is capable of executing a relatively long stroke 15 commensurate approximately with the diameter of flywheel 13, as the flywheel is rotated to revolve linkage point 11, the links of the linkage being moved as this point revolves and two-armed lever element 6 is pivoted about fixed support 8. The closeness of pivot 8 to linkage point 7 assures that two-armed lever 6 transmit a high punching force due to the very favorable transmission ratio. This ratio may be changed to any desired parameter by making linkage point 16 adjustable.

As crank drive 12 is operated to move lever elements 9 and 10, it moves the toggle-joint into the extreme position shown in full lines in FIG. 2, wherein the punching tool is withdrawn below the plane of bottoms 17 of cups 18 to permit the series of connected cups to be advanced for the perforation of its next connecting web 19. As flywheel 13 continues to rotate, the toggle-joint is straightened into the position shown in FIG. 1 to enter in the gap between two adjacent cups and reach web 19, further rotation causing linkage point 11 to move into position 11' to press down two-armed lever element 6 about pivot 8 and thus to impart considerable thrust to the punching tool connected to the toggle-joint, causing tool 1 to perforate connecting web 19 and to punch slits 20 thereinto as shown in FIG. 3.

What is claimed is:

1. A drive for operating a punching tool, which comprises a toggle-joint lever having a first lever member and a second lever member, the punching tool being operatively connected to the first lever member and the second lever member forming part of a quadrilateral linkage; the linkage consisting of the second lever member, a first transverse lever element, a first linkage point at which one end of the second lever member is linked to one end of the first transverse lever element, another lever element, a second linkage point at which the other end of the first transverse lever element is linked to one end of the other lever element, the first transverse lever element being a two-armed lever, a second tranverse lever element, and a third linkage point at which the other end of the other lever element is linked to one end of the second transverse lever element; a fixed pivot supporting the first transverse two-armed lever element near the first linkage point for pivoting of the two-armed lever about the fixed point; and a crank drive, the third linkage point being linked to the crank drive.

2. The drive of claim 1, wherein the crank drive is a flywheel.

3. The drive of claim 1, wherein the other end of the second transverse lever element and the other end of the second lever member are linked to an end of the first lever member remote from the point where the punching tool is connected thereto.

4. A drive for operating a punching tool, which comprises a toggle-joint lever having a first lever member and a second lever member, the punching tool being operatively connected to the first lever member and the second lever member forming part of a quadrilaterial linkage; the linkage consisting of the second lever member, a first transverse lever element, a first linkage point at which one end of the second lever member is linked to one end of the first transverse lever element, another lever element, a second linkage point at which the other end of the first transverse lever element is linked to one end of the other lever element, the first transverse lever element being a two-armed lever, means for adjustably mounting the second linkage point whereby the other lever element is mounted for adjustment in relation to the first transverse lever elememt, a second transverse lever element, and a third linkage point at which the other end of the other lever element is linked to one end of the second transverse lever element; a fixed pivot supporting the first transverse two-armed lever element near the first linkage point for pivoting of the two-armed lever about the fixed point; and a crank drive, the third linkage point being linked to the crank drive.

* * * * *